United States Patent [19]

Shirey

[11] 4,093,968

[45] June 6, 1978

[54] RESISTORS WITH HEAT SINK

[75] Inventor: Robert D. Shirey, Pittsburgh, Pa.

[73] Assignee: Emerson Electric Co., St. Louis, Mo.

[21] Appl. No.: 744,190

[22] Filed: Nov. 22, 1976

[51] Int. Cl.² ............................................. H02H 7/22
[52] U.S. Cl. ....................................... 361/58; 361/10; 338/55; 338/283
[58] Field of Search ........................ 361/10, 58, 11, 9; 338/20, 51, 52, 53, 54, 55, 57, 58, 59, 206, 214, 230, 238, 243, 248, 280, 283, 315, 316, 318

[56] References Cited

U.S. PATENT DOCUMENTS

| 1,809,227 | 6/1931 | Baily .................................. 338/55 X |
| 2,591,442 | 4/1952 | Lacy-Hulbert et al. .......... 338/51 X |
| 3,590,319 | 6/1971 | Baltensperger .................... 361/10 X |
| 3,697,923 | 10/1972 | Griffes ............................ 338/283 X |

Primary Examiner—Patrick R. Salce
Attorney, Agent, or Firm—Michael Williams

[57] ABSTRACT

A resistor with a heat sink, particularly adapted for use as a current limiter in an electrical system, such as a power transmission system. The resistor comprises a hollow tube formed of metal which offers resistance to the passage of electrical current, the tube being of a length sufficient to provide the electrical resistance for a given application. The heat sink comprises a material having a high specific heat, the material being contained within the tube and adapted to absorb heat generated by the resistance of the tube to passage of electrical current.

9 Claims, 3 Drawing Figures

U.S. Patent        June 6, 1978        4,093,968
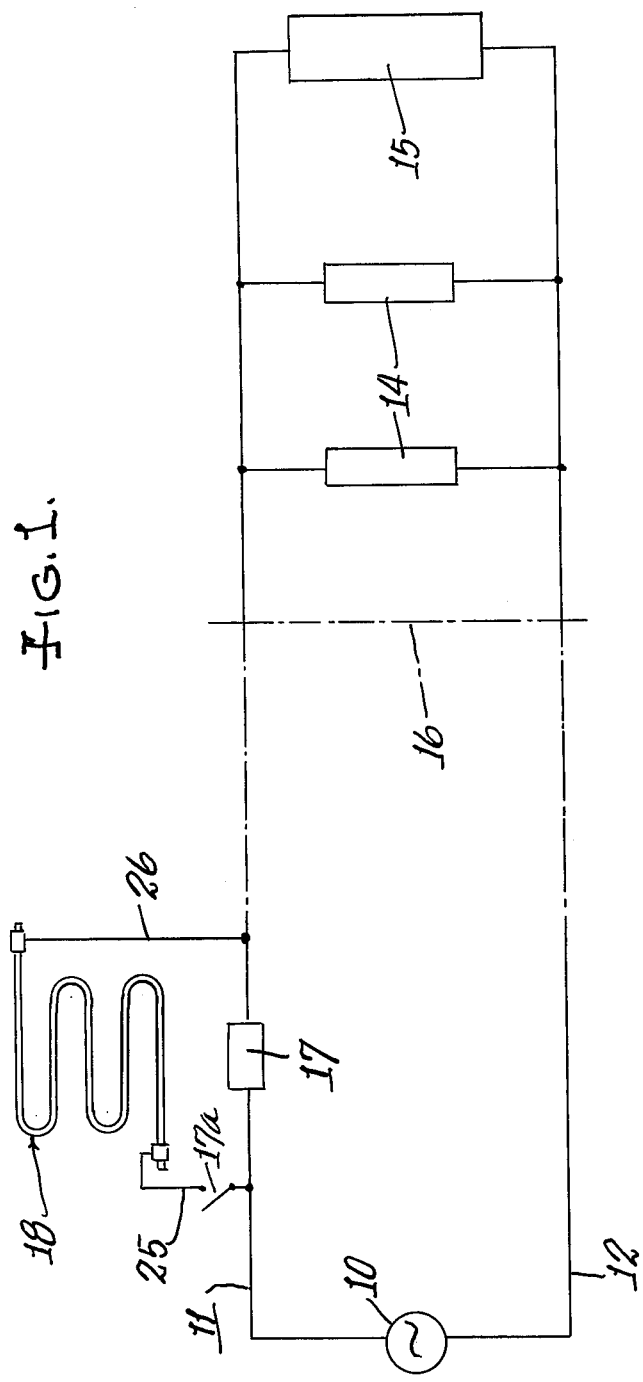
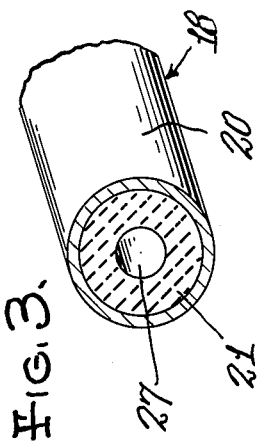
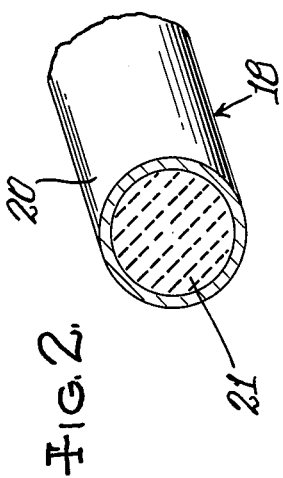

RESISTORS WITH HEAT SINK

BACKGROUND AND SUMMARY

Resistors with heat sinks find use in many applications where electrical current is required to be diverted from an electrical system for some purpose, and one important application is in a power transmission system wherein the resistor serves as a fault current limiter.

A fault current limiter must perform three important tasks in order to successfully accomplish its primary purpose of reducing the duty not only on the circuit breakers but also on the transformers, bus sections and all other equipment in a power system. First of all, it must reduce the first (or major) cycle peak current produced by a fully symetrical fault. Second, it must limit subsequent cycles of current after the initial peak and before the breaker opens to remove the fault. And third, it must absorb the heat generated when the fault current is diverted to the limiter.

In a paper prepared by Thomas H. Dodds and Narayan S. Rau, entitled "Current Commutation To A Resister As A Fault Current Limiter", background material on fault current limiters is outlined. A copy of this paper accompanies this application.

My invention provides an effective resistor with heat sink which is ideally suited for use as a fault current limiter in a power system. The construction may be produced at a relatively low cost, and comprises a tube formed of a metal having current resistive properties, and a material preferably highly compacted within the tube, the material having a high specific heat and being non-conducting.

DESCRIPTION OF THE DRAWING

In the drawing accompanying this specification and forming a part of this application, there is shown, for purpose of illustration, an embodiment which my invention may assume, and in this drawing:

FIG. 1 is a schematic representation of a power system, showing my improved resistor incorporated therein, FIG. 2 is an enlarged, sectional view through the resistor, and FIG. 3 is a view similar to FIG. 2 but showing a slightly modified form.

DISCLOSURE OF THE PREFERRED EMBODIMENT

FIG. 1 schematically discloses a power transmission circuit, wherein power from a generator 10 is lead through transmission lines 11 and 12 to power use outlets, such as transformers 14, sub-stations 15 and the like, which may be located miles away from the generating station.

Since the power lines 11 and 12 are usually very long, it is not practical to maintain constant surveillance thereof, and shorting across such lines may occur, either accidentally or by subvertive acts. Acts of nature, like lightning, high wind storms and floods have also been responsible for shorting across the lines.

As a result, utility systems have experienced major outages caused by through-fault failures of circuit breakers, transformers, buses, or lines. In the past, most power systems have withstood extraordinary stresses because of the conservative design margins built into the equipment components. However, at the rate that fault currents are increasing in magnitude, those margins may no longer be technically possible or economic to build.

In order to provide one specific example of a power system with which my invention may be used, it is assumed that the generator 10 (or generators) will produce a source voltage of 72.5 KV and, in the event of a short across the lines 11 and 12 (such as the short indicated by the dot-dash line 16) the fault current in this example will be much greater than the maximum acceptable 35000 amperes. This current, unless limited to an acceptable value, could cause serious damage to the generator, circuit breakers and other like electrical equipment, and cause a serious power outage that would be expensive and time-consuming to correct.

Therefore, a fault current limiter should be instantly switched into the power system to absorb some of the fault current, and the energy developed thereby. As seen in FIG. 1, a commutation device 17 is disposed in series in the power line 11 and is adapted to be instantly reactive to an abnormally large increase in current flow. The commutation device is of commercially available form, and may be of the type that produces an arc voltage which opposes the source voltage, thereby tending to force or commutate current into the limiter designated generally by the reference numeral 18. As seen in FIG. 1, the limiter is electrically connected in parallel with the power line 11, and a switch 17a is shown to switch the limiter into the power system. Once the current commutated into the limiter reaches the value of the system current the commutation device 17 recovers.

Accordingly, should a short develop in the power system, a first cycle peak current will be developed and the energy of this first cycle, and subsequent cycles must be absorbed by the limiter 18, until the system breaker opens. In the specific example above-noted, the limiter restricts the fault current to the acceptable 35000 amperes and the energy developed as a result must be absorbed in a matter of 0.266 seconds in order to avoid injury to the component parts of the system.

My improved fault current limiter comprises a length of tubing 20, formed of a metal which resists flow of current therethrough, and therefore acts in the manner of a resistor. Such metal may be Inconel, Incoloy, Nichrome, or any of the family of stainless steels. The tube may have any desired cross-section, although round is preferred since this shape lends itself well to manufacturing operations.

Since the tubing 20 offers resistance to the flow of current therethrough, it will heat very rapidly, and to absorb such heat, I provide a heat sink 21 within the tubing. Such heat sink should be formed of a material which is non-conducting and has a high specific heat. I have found that magnesium oxide is a good material for this purpose, although other materials, such as aluminum oxide, boron nitride or other like refractory materials, as well as liquid sodium and the like, may be used.

In producing the fault current limiter of my invention, the heat sink material 21, in granular form, is flowed into the tubing 20, preferably with a vibratory action on the tubing to densely pack the material within the tubing. The tubing is subjected to a rolling or other side pressing action so as to reduce its diameter and thereby compact the material 21 to a rock-like hardness. These steps are somewhat similar to those used in production of a metal-sheathed electric heating elements, except that the encased resistor of the latter is omitted.

The advantages of a fault current limiter of my invention are many. For example, it is relatively low in cost and may be produced by apparatus now used to manufacture sheathed electric heating elements. Also, since the tubing 20 acts as the resistor, a large surface area is exposed. Further, since the material 21 is densely packed within the tube, a large thermal mass for efficient heat sink purposes is provided. Also, in the event the tubing is made of a stainless steel, the fault current limiter is corrosion-resistant and may be used in outdoor installations without requiring any maintenance or care.

In the specific example given, with fault current of 35000 amperes and time duration of 0.266 seconds to absorb the fault, the energy to be absorbed by the fault limiter has been calculated at $21 \times 10^6$ joules. For a practical application of my fault limiter, I have chosen Inconel as the metal for the tubing. Considering the resistance of this metal, I have calculated a tubing length of about 550 feet (about 166 meters), a tubing inside diameter of about 1.444 inches (about 3.7 centimeters) and a tubing outside diameter of about 1.5 inches (about 3.9 centimeters), to provide a resistance of 2.07 ohms. The material 21 in this case is magnesium oxide.

The components of power systems, such as generators, main power transformers and the like may vary. In another specific example, the source voltage remains at 72.5rV, but the acceptable fault current amounts to only 6350 amperes. The time duration of the fault is in this case limited to 0.5 seconds, to absorb $72 \times 10^6$ joules. In such example, my fault current limiter has a metal sheath of Inconel of a length of about 930 feet (about 276 meters). The inside diameter of the tubing is about 0.365 inches (about 9.525 millimeters) and the outside diameter is about 0.440 inches (about 11.509 millimeters), to provide a resistance of 10 ohms. The heat sink material 21 is magnesium oxide.

In view of the great length of the power lines 11 and 12, the length of tubing in my improved fault current limiter should present no problems. However, in the interest of compactness, the tubing may be formed to a sinuous shape, as shown in FIG. 1, or it may be formed to a spiral or other compact shape. This may be easily done, without affecting the rock-like hardness of the heat since material, with apparatus such as is used in forming metal-sheathed electric heating elements.

As shown in FIG. 1, opposite ends of the tubing 20 are electrically connected to conductors 25 and 26, which respectively connect to the power line 11 on opposite sides or the commutation device 17. To improve heat dissipation, the heat sink material 21 may have an opening 27 longitudinally therethrough, as shown in FIG. 3, for the circulation of a cooling medium, such as a gas or liquid.

I claim:

1. A current limiter, comprising:
    a continuous length of tubing, formed of a metal which is resistive to the flow of electrical current therethrough, opposite ends of said tubing being adapted for electrical connection in a line of an electrical system for limiting current flow therein,
    and non-conducting material of high specific heat in heat transfer relationship with the interior surface of said tubing,
    said material being adapted to absorb heat generated by the resistance to current flow in said tubing.

2. The construction according to claim 1 wherein said material fills the entire cross-section of said tubing.

3. The construction according to claim 1 wherein said material has a longitudinally extending opening for the circulation of a cooling medium.

4. The construction according to claim 1 wherein said tubing is formed of a stainless steel.

5. The construction according to claim 1 wherein said material is a refractory which is densely packed within said tubing.

6. The construction according to claim 5 wherein said material has a longitudinally extending opening for the circulation of a cooling medium.

7. The construction according to claim 5 wherein said material is magnesium oxide which is packed within said tubing to a rock-like hardness, and completely fills the cross-section of said tubing throughout the active length thereof.

8. The construction according to claim 1 including the combination with a power distribution system having power distribution lines, wherein said tubing is switched into parallel with a portion of one of the power distribution lines, and further including a commutation device for instantly switching said current limiter into said system when an abnormal amount of current flows therein.

9. The construction according to claim 8 wherein said power distribution system includes a circuit breaker constructed and arranged to open and interrupt flow of current therein a predetermined interval of time after a fault in said system persists,
    said commutation device switching said current limiter into said system to absorb the first cycle peak current and subsequent cycles caused by said fault until said circuit breaker opens.

* * * * *